(12) United States Patent
Moulder

(10) Patent No.: US 6,415,573 B1
(45) Date of Patent: *__Jul. 9, 2002__

(54) METAL BUILDING INSULATION ASSEMBLY

(75) Inventor: Ronald Moulder, Norristown, PA (US)

(73) Assignee: CertainTeed Corporation, Valley Forge, PA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/396,607

(22) Filed: Sep. 15, 1999

(51) Int. Cl.$^7$ .............................. E04B 5/00; B32B 5/32
(52) U.S. Cl. ........................ 52/408; 52/409; 442/327; 442/331; 442/333
(58) Field of Search ................ 52/404.1, 408, 52/406; 442/327, 331, 333, 401, 85

(56) References Cited

U.S. PATENT DOCUMENTS

| | | | |
|---|---|---|---|
| 4,375,742 A | | 3/1983 | Paliwoda |
| 4,726,985 A | * | 2/1988 | Fay et al. .................... 428/228 |
| 4,972,644 A | * | 11/1990 | Rumiesz, Jr. et al. .......... 52/406 |
| 5,442,890 A | | 8/1995 | Fligg |
| 5,692,352 A | | 12/1997 | Simpson |
| 5,704,179 A | * | 1/1998 | Lehnert et al. ................ 52/408 |
| 5,724,780 A | | 3/1998 | Bolich |
| 5,888,614 A | * | 3/1999 | Slocum et al. .............. 428/132 |

* cited by examiner

Primary Examiner—Patrick J. Chavez
(74) Attorney, Agent, or Firm—Paul & Paul

(57) ABSTRACT

Metal building insulation includes a non-woven covering material over the top surface of a double layer of glass fiber, with a vapor retarder between the layers, protected by a porous film.

12 Claims, 1 Drawing Sheet

METAL BUILDING INSULATION ASSEMBLY

BACKGROUND OF THE INVENTION

1. Field of the Invention

The present invention relates to building insulation, which includes a blanket of mineral fibers, and a facing sheet adhered to the top of the blanket to form a batty for use in insulating metal building walls and ceilings.

2. Brief Description of the Prior Art

Insulation blankets formed from mineral fibers, very often fiber glass, are well known and have long been used for building insulation. The thickness of the mineral fiber blanket is generally proportional to the insulative effectiveness or "R-value" of the insulation. The blanket is typically formed from glass fibers, often bound together using a resinous material. The insulation may be compressed after manufacture and packaged, so as to minimize the volume of the product during storage and shipping and to make handling and installing the insulation easier. After the packaging is removed, the insulation batty tends to quickly "fluff up" to its prescribed label thickness for installation.

Such insulation typically has exposed mineral fiber surfaces on two sides and on the one or both of the major surfaces of the blanket. The exposed surfaces permit air to be easily removed from the insulation batty during compression prior to packaging, and to quickly reenter the product after the packaging is removed at the installation site. However, the exposed surfaces can make installation troublesome, as contact may irritate exposed flesh, and some release of unbound fibers and dust into the working environment may occur. Similarly, it is desirable to avoid installation in such a way so that exposed surfaces are presented for subsequent contact. Circumstances may sometimes dictate that insulation without an attached vapor retarder, such as unfaced batts, is used. For example, when additional insulation is being added over previously installed material having a vapor retarder, it is desirable to avoid providing yet another vapor retarder. In these cases, however, the additional unfaced insulation batts are hidden from the building's interior by preexisting walls, ceiling panels, etc.

Buildings having walls and roofs formed using metal panels frequently offer an optimum balance of cost and performance for industrial and commercial uses. To provide both thermal and acoustic insulation such buildings are often insulated using fiber glass insulation batts. This metal building insulation is typically faced with vapor barrier sheet material as a vapor retarder, and the insulation is installed with the retarder towards the conditioned spaces within the building. The insulation is normally applied over or in between the structural members of the building and is held in place by the covering sheets or by an insulation support system.

Metal building roof assemblies typically include a series of purlins arranged over and perpendicular to the structural rafters. Insulation batts are secured in between or over the purlins and are covered by the roof decking. A variety of systems have been developed for installing insulation in existing and new metal buildings, such as disclosed for example, in U.S. Pat. Nos. 4,375,742, 5,442,890, 5,692,352 and 5,724,780.

Depending on the activities performed in the building, metal buildings for industrial and commercial uses can present noisy environments for their occupants. For example, manufacturing and even warehousing operations can generate significant levels of noise. Hard metal interior surfaces simply reflect and exacerbate such noise. Covering metal interior surfaces with fiber glass insulation can help ameliorate this situation through sound absorption. For example, a fiber glass batty covered with a vapor retarder and having a nominal thickness of 3⅛ inches can have a sound absorption coefficient of 0.52 at 125 Hertz and 0.45 at 2000 Hertz (ASTM C 423-Type A mounting), while an unfaced batty with a nominal thickness of 3½ inches can have a sound absorption coefficient of 0.38 at 125 Hertz and 0.97 at 2000 Hertz. Although some reduction in noise is achieved with the faced insulation, this level of sound absorption remains below that achievable with unfaced insulation, and an additional reduction in noise is desirable.

The vapor retarder serves two important purposes in the typical metal building insulation installation. First, it serves to retard the transmission of moisture-laden interior air to the cold interior surface of the metal walls and/or roof of the building during the winter, thus avoiding or reducing condensation related problems. Second, it protects the fiber glass insulation from contact and abuse, especially when metal building are constructed without rigid interior walls and ceilings, so that the insulation is presented directly to the interior.

As noted above, occasionally it is desirable to employ insulation batts without an integral vapor retarder facing. For example, it may be desirable to insulate interior walls for acoustic reasons. Similarly, it may be desirable to increase the effective "R-value" of previously installed insulation in exterior walls or roofs to decrease heat or air-conditioning loses due to an increase in fuel costs or to Increase acoustic insulation because different, noisier activities are being conducted in the building. If the preexisting insulation already includes a vapor retarder, installing insulation with another vapor retarder should be avoided so that moisture is not trapped between the two vapor retarders. On the other hand, it is desirable to protect the interior face of the additional insulation from abuse. However, providing a rigid interior wall or ceiling surface over the new insulation is likely to prove prohibitively expensive and may not improve sound absorption.

There is a need for insulation for metal building, which does not include a vapor retarder, facing but which provides protection against abuse after installation and provides sound absorption. Also, if a vapor barrier is required, an insulation system that provides good sound absorption plus a vapor barrier is needed.

SUMMARY OF THE INVENTION

The present invention provides a solution to the problems associated with the installation of mineral fiber blankets having unfinished surfaces for use as insulation in metal buildings. In addition, the present invention provides metal building insulation with enhanced sound absorption and noise reduction properties.

The present invention provides a mineral fiber insulation assembly for use in insulating metal building walls and ceilings. The insulation assembly includes a first insulation layer comprising glass fiber, preferably, a low density glass fiber material, with a density of from about 0.3 to 1.5 pounds per cubic foot ($4.8 \times 10^{-3}$ g/cm$^3$ to $2.4 \times 10^{-2}$ g/cm$^3$). The first insulation layer preferably takes the form of a glass fiber insulation batty having a first major face, a second major face, and a pair of opposed side faces. Preferably, the first major face is covered with a vapor retarder material, which is preferably bonded to the face using a suitable adhesive material. The insulation assembly also includes a second insulation layer comprising glass fiber. This second layer also preferably comprises a low-density glass fiber material. The second insulation layer also preferably takes the form of a glass fiber insulation batty having a first major face and a second major face. The first major face of the second insulation layer has a covering of porous material, preferably a perforated film formed from a plastic material such as vinyl, for example, a vinyl film having a thickness of from about 2 to 3 mils. The perforations preferably are uniformly distributed over the film, and comprise at least about 20 percent of the surface of the film. Alternatively, a nonwoven fabric facing can be used. The nonwoven fabric facing is preferably selected from rayon, spun-bonded polyester, spun-bonded polyolefin, and thermally bonded polypropylene. The second major face of the second insulation material is provided adjacent to the covering of vapor retarder material on the first major face of the first insulation layer.

In another embodiment the present invention provides a composite structure comprising a metal building panel, such as an exterior wall or roof deck panel, and an insulation assembly as described above.

In a third embodiment, the present invention provides a composite structure including a metal building panel, and an insulation assembly comprising single layer of glass fiber. The glass fiber layer preferably comprises a low density glass insulation batty having a first major face with a covering of porous material adhered thereto.

DETAILED DESCRIPTION

The insulation assembly of the present invention can be manufactured using conventional mineral fiber blankets or mats, for example, glass fiber mats produced from fibers formed from a glass melt, and treated with a binder such as phenolformaldehyde resole resin-based binder, which may be urea-modified. Insulation intended for thermally insulating buildings typically has a low glass fiber density, such as from about 0.3 to 1.5 pounds per cubic foot ($4.8 \times 10^{-3}$ g/cm$^3$ to $2.4 \times 10^{-2}$ g/cm$^3$). A bituminous coating is sometimes applied as a vapor barrier. For example, an amount effective to reduce the water permeability to no more than about one perm may be applied. In other forms, where a vapor retarder or barrier is not desirable, the glass fiber blanket has no facing.

Figure 1:
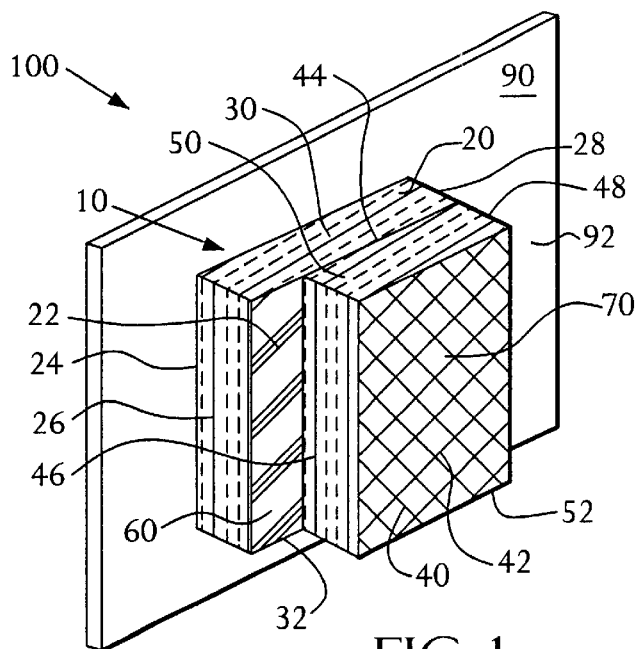
FIG. 1 is a perspective view of a composite structure and insulation assembly according to the present invention, shown with the two layers of the insulation assembly cut away to reveal underlying surfaces.

Referring now to the drawings, in which like reference numerals identify like elements throughout the several views, there is shown in FIG. 1 a perspective view of a composite structure 100 according to the present invention shown in partial section to reveal underlying surfaces. The composite structure 100 includes an insulation assembly 10 and a metal panel 90, forming a portion of an exterior wall or roof deck of a metal building. The insulation assembly 10 has a first insulation layer 20 formed from glass fiber material, preferably a low-density glass fiber material bonded with a resinous binder. A conventional low-density glass fiber blanket or mat formed from glass fibers treated with a phenol-formaldehyde resole resin-based binder can be employed. The first insulation layer 20 has a first or upper major surface or top 22, an opposed, a generally parallel lower major surface or bottom 24; a pair of opposed generally parallel side surfaces 26, 28, and a pair of opposed, generally parallel end surfaces 30, 32. The glass fibers are generally oriented from one end surface 30 to the other end surface 32 and parallel the side surfaces 26, 28 and major surfaces 22, 24.

The first insulation layer 20 of the insulation assembly 10 also includes a vapor retarder or barrier 60 extending over the entire upper surface 22 of the insulation layer 20 (shown cut away in FIG. 1 to reveal a portion of the interior surface 92 of the metal panel 90).

The vapor retarder 60 can be formed from a thin plastic sheet, such as a polyethylene sheet. Preferably, the vapor retarder 60 has permeability to water vapor of one perm or less.

The insulation assembly 10 also includes a second insulation layer 40 formed from glass fiber material, preferably a low density glass fiber material bonded with a resinous binder. A conventional low density glass fiber blanket or mat formed from glass fibers treated with a phenol-formaldehyde resole resin-based binder can be employed for this second insulation layer 40 as well as the first. Preferably, this second layer is relatively thin, having a thickness (uncompressed) of from about one half to two inches (1.2–5.4 cm). The second insulation layer 40 has a first or upper major surface or top 42, an opposed, a generally parallel lower major surface or bottom 44; a pair of opposed generally parallel side surfaces 46, 48, and a pair of opposed, generally parallel end surfaces 50, 52. The glass fibers are similarly generally oriented from one end surface 50 to the other end surface 52 and parallel the side surfaces 46, 48 and major surfaces 42, 44.

The second insulation layer 40 also includes a covering of porous material 70 on its upper major surface 42 and which optionally extends over the sides 26, 28, 46, 48 of both layers 20, 40.

The covering 70 is preferably formed from a porous film, such as a porous polymeric film, preferably, a porous "vinyl" (that is, polyvinyl chloride) film having a thickness of from about 2 to 3 mils. To increase the acoustic damping of the insulation it is preferred that the film be perforated, such as by slits or holes, either during manufacture of the film or during production of the insulation assembly 10, so that air can easily enter and leave the insulation layer 40. Preferably, the perforations or pores are uniformly distributed over the surface of the film and comprise at least about 20 percent of the surface area of the film. Other types of films which can be used include thermoplastic and thermosetting plastic films including polyethylene film. Flexible, low modulus films are preferred. However, it is preferred that the film have good resistance to mechanical damage, abrasion, tearing, and the like so as to protect the underlying layer.

Alternatively, a web of non-woven material may also be employed as the porous material. Non-woven materials are sheets of randomly oriented natural or synthetic fibers, such as polyolefins, polyester or rayon, often secured together by a binder, typically based on a polymeric material, such as an acrylic resin, a vinyl-acrylic resin, or the like. The non-woven material may be, for example, spun-bonded polyester or polyolefin, or a thermally bonded polypropylene.

The covering 70 is preferably secured to at least a portion of the surfaces of the layers 20, 40, preferably using an adhesive material, such as a hot melt adhesive material, which can be applied to the web of covering 70 or to portions of the sides 26, 28, 46, 48 of the two layers 20, 40 and/or to the upper surface 42 of the second layer 40, just before the covering 70 is applied.

Preferably, the lower or second major surface 44 of the second insulation layer 40 is adhesively bonded to the vapor retarder 60 which in turn is preferably adhesively bonded to the upper or first major surface 22 of the first insulation layer 20. A hot melt or other conventional adhesive material can be employed to adhesively bond the vapor retarder 60 to either insulation layer 20, 40.

The insulation assembly 10 is optionally adhesively bonded or mechanically secured to the panel 90 using conventional mechanical fastening means to provide the composite structure 100.

Figure 3:
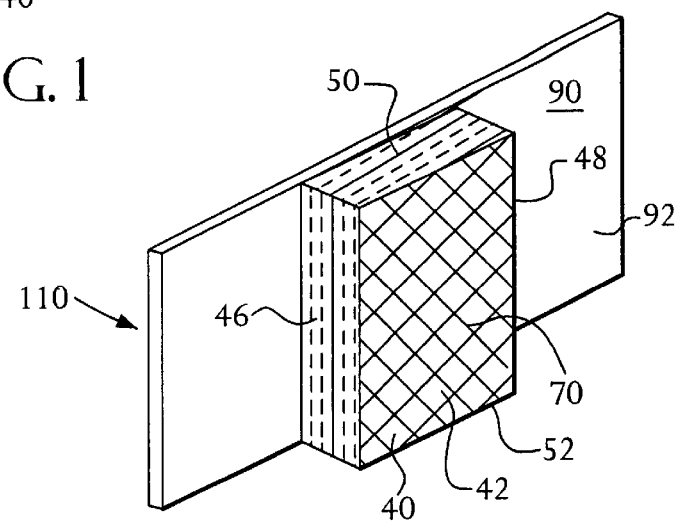
FIG. 3 is a perspective view of another embodiment of a composite structure according to the present invention.
Figure 2:
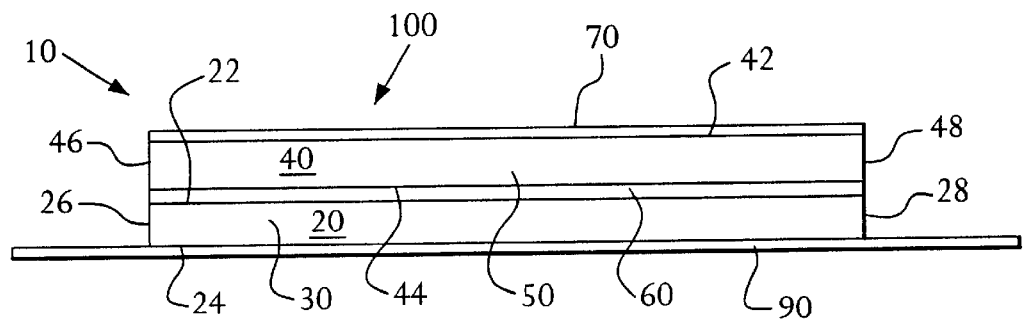
FIG. 2 is an elevational view of the composite structure of FIG. 1 as viewed from one end.

In another embodiment of the present invention, a composite structure 110 (FIG. 3) includes a metal panel 90 and a single insulation layer 40 preferably formed from a low density glass fiber material, and having a porous covering 70 extending over the first or upper major surface 42. The porous covering 70 is preferably formed from a porous film such as a porous polyvinyl chloride film. The single insulation layer 40 is optionally secured to the panel 90 to provide the composite structure 110.

Various modifications can be made in the details of the various embodiments of the processes, compositions and articles of the present invention, all within the scope and spirit of the invention and defined by the appended claims.

I claim:

1. An insulation assembly for use in insulating metal building walls and ceilings, the insulation assembly comprising:
   a first insulation layer comprising glass fiber, said first insulation layer having a first major face, a second major face, and a pair of opposed side faces; said first major face having a vapor retarder material adhered thereto; and
   a second insulation layer comprising glass fiber, said second insulation layer having a first major face and a second major face, the first major face of the second insulation layer having a covering of porous material adhered thereto, the second major face of the second insulation material being provided adjacent to the covering of vapor retarder material adhered to the first major face of the first insulation layer.

2. An insulation assembly according to claim 1 wherein the second major face of the second insulation material is adhered to the covering of vapor retarder material.

3. An insulation assembly according to claim 1 wherein the second insulation layer comprises low-density glass fiber insulation.

4. An insulation assembly according to claim 1 wherein the first insulation layer comprises low-density glass fiber insulation.

5. An insulation assembly according to claim 1 wherein the porous material is a porous film.

6. An insulation assembly according to claim 5 wherein the porous material is a nonwoven fabric facing selected from rayon, spun-bonded polyester, spun-bonded polyolefin, and thermally bonded polypropylene.

7. A composite structure comprising:
   a metal building wall, and
   an insulation assembly comprising:
      a first insulation layer comprising glass fiber, said first insulation layer having a first major face, a second major face, and a pair of opposed side faces; said first major face having a vapor retarder material adhered thereto; and
      a second insulation layer comprising glass fiber, said second insulation layer having a first major face and a second major face, the first major face of the second insulation layer having a covering of porous material adhered thereto, the second major face of the second insulation material being provided adjacent to the covering of vapor retarder material adhered to the first major face of the first insulation layer.

8. A composite structure according to claim 7 wherein the second major face of the second insulation material is adhered to the covering of vapor retarder material.

9. A composite structure according to claim 7 wherein the second major face of the second insulation material is adhered to the covering of vapor retarder material.

10. A composite structure according to claim 7 wherein the second insulation layer comprises low-density glass fiber insulation.

11. A composite structure according to claim 7 wherein the porous material is a porous film.

12. A composite structure according to claim 11 wherein the porous material is a nonwoven fabric facing selected from rayon, spun-bonded polyester, spun-bonded polyolefin, and thermally bonded polypropylene.

* * * * *

UNITED STATES PATENT AND TRADEMARK OFFICE
CERTIFICATE OF CORRECTION

PATENT NO.    : 6,415,573 B1
DATED         : July 9, 2002
INVENTOR(S)   : Ronald Moulder It is certified that error appears in the above-identified patent and that said Letters Patent is hereby corrected as shown below:

Column 1,
Lines 8, 21 and 26, delete "batty" and insert -- batt --.

Column 2,
Lines 4, 8 and 36, delete "batty" and insert -- batt --.
Line 31, delete "loses" and insert -- losses --.

Column 3,
Lines 4 and 26, delete "batty" and insert -- batt --.

Signed and Sealed this

Fifth Day of November, 2002

Attest:

JAMES E. ROGAN
Attesting Officer                    Director of the United States Patent and Trademark Office